(12) United States Patent
Matias et al.

(10) Patent No.: US 10,954,708 B2
(45) Date of Patent: Mar. 23, 2021

(54) MOVABLE BARRIER OPENER WITH BRUSHLESS DC MOTOR

(71) Applicant: GMI Holdings, Inc., Mt. Hope, OH (US)

(72) Inventors: Greg Matias, Copley, OH (US); Brent Buescher, Jr., Wooster, OH (US); Dan Punchak, Wadsworth, OH (US)

(73) Assignee: GMI Holdings, Inc., Mt. Hope, OH (US)

( * ) Notice: Subject to any disclaimer, the term of this patent is extended or adjusted under 35 U.S.C. 154(b) by 242 days.

(21) Appl. No.: 16/044,120

(22) Filed: Jul. 24, 2018

(65) Prior Publication Data

US 2019/0024431 A1    Jan. 24, 2019

Related U.S. Application Data

(60) Provisional application No. 62/536,379, filed on Jul. 24, 2017, provisional application No. 62/536,385, filed on Jul. 24, 2017, provisional application No. 62/536,390, filed on Jul. 24, 2017.

(51) Int. Cl.
| | |
|---|---|
| *E05F 15/41* | (2015.01) |
| *E05F 15/668* | (2015.01) |
| *H02P 6/182* | (2016.01) |
| *H02P 29/64* | (2016.01) |

(52) U.S. Cl.
CPC ............ *E05F 15/41* (2015.01); *E05F 15/668* (2015.01); *H02P 6/182* (2013.01); *H02P 29/64* (2016.02); *E05Y 2201/434* (2013.01); *E05Y 2201/696* (2013.01); *E05Y 2400/322* (2013.01); *E05Y 2400/33* (2013.01); *E05Y 2400/45* (2013.01); *E05Y 2400/61* (2013.01); *E05Y 2900/106* (2013.01)

(58) Field of Classification Search
CPC .............................. E05F 15/44; H02H 7/0851
USPC ............................................. 318/400.01, 700
See application file for complete search history.

(56) References Cited

U.S. PATENT DOCUMENTS

| | | | |
|---|---|---|---|
| 7,301,298 B2* | 11/2007 | Shao | H02P 6/182 318/400.35 |
| 7,972,027 B1 | 7/2011 | Hatfield | |
| 8,405,337 B2* | 3/2013 | Gebhart | H02P 6/085 318/400.01 |
| 8,729,837 B2* | 5/2014 | Tandrow | G05B 19/19 318/268 |
| 9,000,703 B2* | 4/2015 | Chew | H02P 6/182 318/400.34 |
| 2006/0202815 A1 | 9/2006 | John | |
| 2009/0122534 A1 | 5/2009 | Olmsted | |

(Continued)

*Primary Examiner* — David Luo
(74) *Attorney, Agent, or Firm* — Haynes and Boone, LLP

(57) ABSTRACT

A movable barrier opener system having a multiphase brushless DC motor in the drive assembly is provided. The multiphase brushless DC motor may impart motive force to a movable barrier in response to barrier movement instructions from the barrier operator controller to the drive assembly. The barrier operator controller of the movable barrier opener system is configured to detect a back EMF of at least one winding of the multiphase brushless DC motor and determines a position of the movable barrier and/or determines a torque of the multiphase brushless DC motor in response to the detected back EMF. A position sensor and a back EMF sensor module provides actual operating parameters to the controller.

18 Claims, 4 Drawing Sheets

(56) References Cited

U.S. PATENT DOCUMENTS

2010/0027293 A1 2/2010 Li
2014/0085624 A1 3/2014 Wilfinger et al.
2014/0085924 A1 3/2014 Li et al.

* cited by examiner

MOVABLE BARRIER OPENER WITH BRUSHLESS DC MOTOR

RELATED APPLICATION

This application claims the benefit of and priority from U.S. Provisional Patent Application Ser. No. 62/536,379, entitled "BRUSHLESS DC MOTOR OPERATOR," filed Jul. 24, 2017, and naming Greg Matias and Brent Buescher, Jr. as inventors, and U.S. Provisional Patent Application Ser. No. 62/536,385, entitled "BRUSHLESS DC MOTOR OPERATOR," filed Jul. 24, 2017, and naming Greg Matias and Dan Punchack as inventors, and U.S. Provisional Patent Application Ser. No. 62/536,390, entitled "BRUSHLESS DC MOTOR OPERATOR," filed Jul. 24, 2017, and naming Greg Matias as inventor, each of which is incorporated in its entirety by reference herein for all purposes.

TECHNICAL FIELD

The present invention relates generally to movable barrier opener systems for opening and closing garage doors, gates, and other movable barriers, in particular to movable barrier opener systems incorporating brushless DC motors, and even more particularly to new and improved method for effecting control over such systems.

BACKGROUND

Upward acting sectional or single panel garage doors, rollup doors, gates, and other types of powered movable barriers utilize movable barrier opener systems for facilitating control over the movement of the barriers. A typical movable barrier opener system comprises a movable barrier operator and a drive assembly, including a motor, for imparting movement to the movable barrier (e.g., the garage door). The movable barrier operator includes a controller which, typically, constitutes a programmable platform such as a microprocessor, microcontroller, or the like, that is preprogrammed with the appropriate instructions and data for carrying out the desired processing. The operation of most existing movable barrier opening systems is typically responsive to externally transmitted command signals from user-actuation of (i) interior or exterior building mounted consoles, in wired or wireless communication with the movable barrier operator, (ii) hand held or vehicle mounted wireless transmitters, and/or (iii) remotely disposed network (e.g., Internet) access devices (e.g., Smartphones).

The movable barrier operator (or for specifically a garage door, the garage door operator) must, in addition to its other tasks, (i) assure that the force applied by the motor is sufficient to enable the movable barrier (i.e., the garage door) to uninterruptedly travel along its defined path between open and closed limits, while at the same time (ii) assure that abnormal barrier travel conditions such as obstructions or other abnormal occurrences, will result in rapid interruption of the door travel (by motor stoppage, or motor stoppage and reversal.)

During the travel of the movable barrier, typically between a fully open and fully closed position, various motor overload conditions may occur due, for example, to obstruction engagement, mechanical failures, or excessive heat generation. Thus there is a continuing need to monitor and quickly respond to these and other situations resulting in motor overload.

Furthermore, there is a need to continuously determine the location and direction of travel of the movable barrier in order to maintain continuous control over the barrier, and quickly respond to situations which place the barrier and its surroundings in harm's way.

SUMMARY

In accordance with these and other objectives, disclosed herein is a new and improved movable barrier opener system, one incorporating a multiphase brushless DC motor, responsive to barrier movement instructions generated by a programmable controller in the movable barrier operator to the motor drive assembly. In addition to being responsive to externally generated command signals, the controller, for the purpose of generating the barrier movement instructions, is responsive to the receipt of the actual operating parameters (i.e., conditions) of the multiphase brushless DC motor, which parameters may be derived, for example, by a position sensor disposed at the output of the multiphase brushless DC motor and/or by a back EMF sensor module monitoring the back EMF generated from the excitation of the windings of the brushless DC motor.

In accordance with a feature of the new and improved movable barrier opening system, a method of control over the generation of the barrier movement instructions includes an initial determination as to whether an actual operating parameter is, or is not, within a tolerance of an expected range of values, with the pre-programmed controller configured to responsively change the barrier movement instructions in accordance with such determination.

BRIEF DESCRIPTION OF THE DRAWINGS

Alternate embodiments of the herein described apparatus and methods of the present invention, as well as additional features and details thereof, will become readily understood from the following detailed description, taken in connection with the appended drawings, in which.

DETAILED DESCRIPTION

Figure 1:
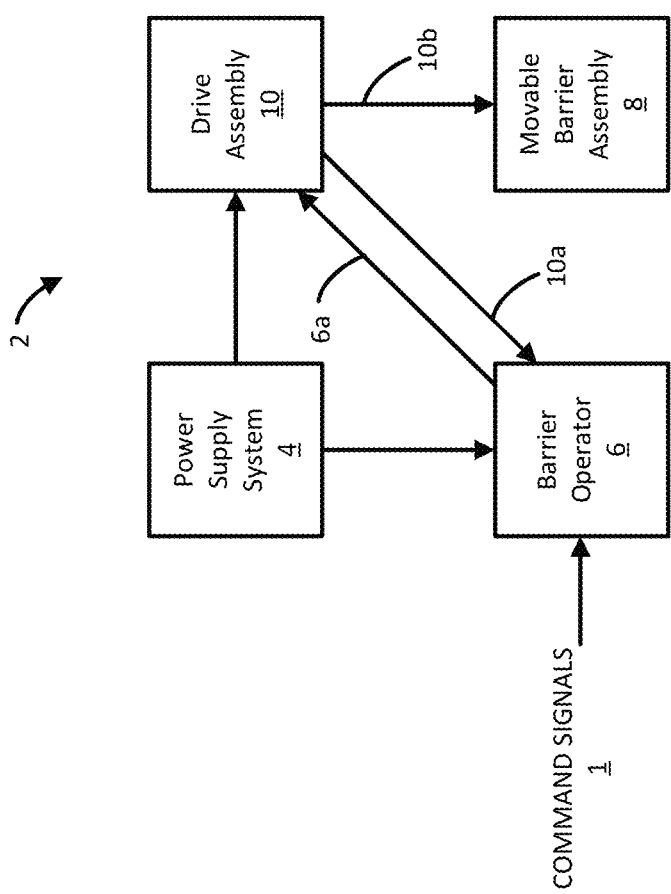
FIG. 1 is a functional block diagram of a movable barrier opener system adapted for incorporation of the new and improved method and apparatus of the present invention.

Referring initially to FIG. 1, a movable barrier opener system 2 comprises a movable barrier operator 6 and drive assembly 10, the output of which is operatively associated with movable barrier assembly 8. Power supply system 4 provides the requisite electrical power to barrier operator 6 and drive assembly 10.

As illustrated, the barrier operator 6, particularly the controller 18 thereof (FIG. 2A), by way of barrier movement instructions transmitted along, and in the direction of, communication pathway 6a, effects control of the operation of the drive assembly 10, and therefore, by way of communication pathway 10b, effects ultimate control of the movement of movable barrier 26 (FIG. 2A) of the movable barrier assembly 8. These barrier movement instructions may be responsive to externally transmitted command signals 1 (e.g., from user actuation of the wall consoles, the hand held transmitters, or the remotely disposed Internet access) and/or, in accordance with a unique feature of the movable barrier opening system of the present invention, responsive to the actual operating parameters (i.e., conditions) of the multiphase brushless DC motor 24 (FIG. 2A) of drive assembly 10 transmitted to the controller 18 of the barrier operator 6 along, and in the direction of, communication pathway 10a, as subsequently described in greater detail. It is to be understood that the communication pathways, particularly pathways 6a and 10a, may be conductive wires or cables or wireless communication paths.

Figure 2A:
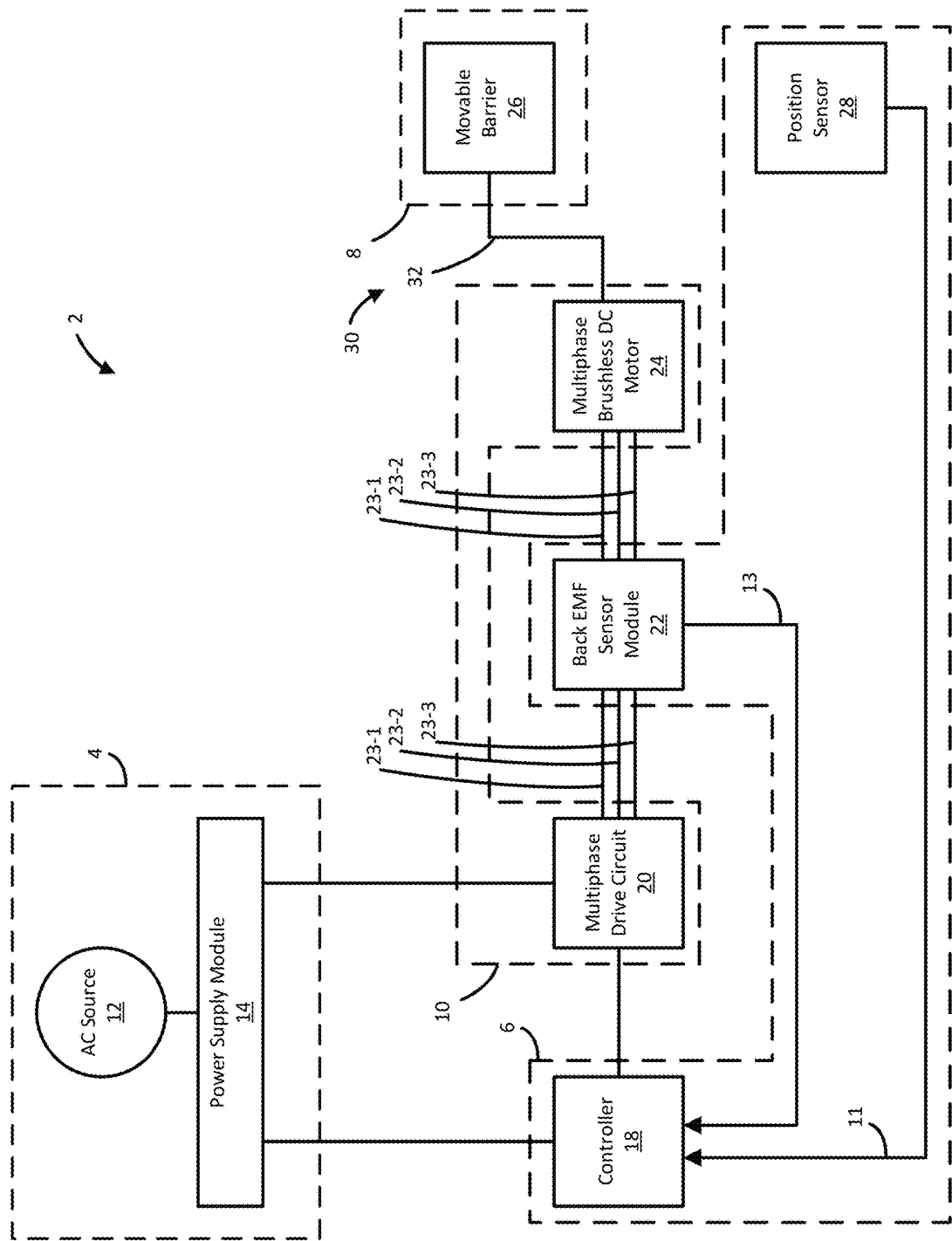
FIG. 2A is a more detailed block diagram view of the movable barrier opener system of FIG. 1, illustrating the incorporation of a multiphase brushless DC motor in the drive assembly, and the use of motor characteristics sensors for providing actual operating parameters, in accordance with an aspect of the present invention.

Referring to FIG. 2A, the power supply system 4 may include an AC source 12, that, for example, comprises an electrical connection to a line current source, such as an electrical plug and/or other interface configured to receive electrical power from an electrical power distribution grid by way of electrical sockets or the like. Power supply system 4 may additionally include a power supply module 14 adapted to receive AC power from AC source 12, and configured to adjust the AC power and rectify the AC power to DC power. The power supply module 14 is configured to produce electrical power suitable for operating the components of the barrier operator 6, including the controller 18, and for operating the components of the drive assembly 10, including multiphase drive circuit 20 and multiphase brushless DC motor 24.

With continued reference to FIG. 2A, the barrier operator 6 includes controller 18, a suitably programmed computer platform, such as a pre-programmed microcontroller, microprocessor, or like apparatus. The controller 18 is operatively coupled, and programmed to provide barrier movement instructions, to appropriate drive circuitry, specifically multiphase drive circuit 20 of the drive assembly 10, and therefore, via windings 23-1, 23-2, and 23-3, to multiphase brushless DC motor 24. As a consequence, the barrier movement instructions from the controller 18 provide the desired operation of the motor 24, such as preferred direction and velocity of rotation of the output shaft of motor 24, preferred motor torque, required motor acceleration and deceleration, and the like.

The controller 18 may provide the requisite barrier movement instructions by way of pulse width modulated drive signals for excitation of the windings of the multiphase brushless DC motor 24. Alternatively, the controller 18 may provide packetized data to the multiphase drive circuit 20 of the drive assembly 10 which generates the drive signals for excitation of one or more windings of the multiphase brushless DC motor 24, in response to the packetized data. Thus, it is to be appreciated that the barrier movement instructions from controller 18 may be embodied in one or more waveforms, and/or one or more packets of data. As such, the barrier movement instructions may be in the form of analog or digital signals.

The controller 18 may provide the barrier movement instructions to the drive assembly 10 in response to, and as a function of, the externally generated command signals 1 and/or in response to, and as a function of, sensed data constituting the actual operating parameters of the motor. For instance, and with reference to FIG. 2A, the barrier operator 6 may also include a back EMF sensor module 22 configured to provide a back EMF sensor signal 13 to the controller 18. From this back EMF, the programmed controller 18 may be able to determine numerous operating parameters, conditions, and characteristics relevant to the motor, including motor load, motor overload, motor speed, and/or extent and direction of motor shaft rotation, and thus the distance and direction of travel of the connected movable barrier 26. In addition, a position sensor 28 may be coupled to the output shaft of the motor 24 to provide the motor shaft position data, and thus the movable barrier position information, to the controller 18, for comparison to the movable barrier position data provided by the sensor module 22.

The back EMF sensor module 22 comprises a sensor configured to detect a back EMF of at least one winding of the multiphase brushless DC motor 24 of the drive assembly 10. The back EMF sensor module 22 may alternatively include an array of sensors respectively configured to detect the back EMF of each one of the plurality of windings of the multiphase brushless DC motor 24.

Thus, while any number of sensors may be used for detecting the back EMF of any number of windings, in accordance with the preferred embodiment of FIG. 2A, a single EMF sensor module 22 is configured to detect a first back EMF of winding 23-1 of the multiphase brushless DC motor 24, a second back EMF of winding 23-2 of multiphase brushless DC motor 24, and a third back EMF of winding 23-3 of multiphase brushless DC motor 24. Therefore, the single sensor module 22 generates a back EMF sensor signal 13 in response to the detected back EMF of the first winding, the back EMF of the second winding, and the back EMF of the third winding, the resulting sensor signal 13 provided by the back EMF sensor module 22 to the controller 18.

In accordance with another feature of the present movable barrier opening system, the controller 18 may relate the barrier movement instructions to the actual operating parameters by a transfer function, to create a "movable barrier profile" characterizing the physical properties of the movable barrier 26. For instance, the controller 18 may determine tolerances for the actual operating parameters based on historical data over time showing a tendency of the operating parameters to remain within a certain range. This range may be the preset tolerance for the relevant operating parameter. The controller 18 then determines if the operating parameters are out of tolerance, thereby indicating a fault condition such as an obstruction, a damaged movable barrier 26, an unsuitable movable barrier 26 for a particular multiphase brushless DC motor 24 or other components, a motor over temperature situation, and/or the like, and carries out the appropriate operation in recognition of such out of tolerance status. An out of tolerance operating parameter may also indicate that a movable barrier position calculation that is based on the operating parameter is less accurate than expected.

In accordance with another feature, the controller 18 may relate the actual operating parameters to an "interpretation matrix" to calculate barrier position metrics. An interpretation matrix may comprise a lookup table referenced by the controller 18, the look up table comprising a database of operative parameters corresponding to a position (and/or direction) of the movable barrier 26. The interpretive matrix may also comprise machine learning features. For instance, the controller 18 may collect movement parameters, and/or operative parameters over time and may revise the movable barrier profile over time based on the movement parameters and/or operative parameters. The interpretation matrix may then be changed in response to the revisions. Barrier position metrics may include a relative and/or actual position and/or direction of a movement of the movable barrier 26.

In accordance with the embodiment of FIG. 2A, the position sensor 28 is a component of the barrier operator 6, the position sensor 28 generating a position sensor signal 11 corresponding to the motor shaft position to the controller 18. While both the position sensor 28 and the back EMF sensor module 22 are depicted in FIG. 2A, one may appreciate that the use of both sensor assemblies may not always be necessary, depending upon the need for redundancy.

In various embodiments, a position sensor 28 comprises a sensor that generates a position sensor signal 11 in response to a "detection action". For example, a detection action may include determining an obstruction in a path of the movable barrier 26. For instance, the position sensor 28 may include an optical beam sensor that determines when an obstruction is positioned in a path of a movable barrier 26 in response to the obstruction interfering with an optical beam.

In further instances, a detection action may include determining that the movable barrier 26 is at an end point of travel. For instance, the position sensor 28 may comprise a switch configured to actuate in response to the movable barrier 26 reaching an end point of travel. Thus, in various instances, the position sensor 28 may determine a position of an obstruction, and in further instances, the position sensor 28 may determine a reference position of a movable barrier 26 corresponding to an end point of travel.

The position sensor 28 may provide a position sensor signal 11 to the controller 18 which uses the position sensor signal 11 to "index" the actual operating parameters against the end points of the movable barrier 26 travel. In other applications, no position sensor 28 is utilized and such indexing is performed by monitoring a back EMF sensor module 22 and determining that a sensed back EMF corresponds to a torque of a multiphase brushless DC motor 24 having moved a movable barrier 26 to a hard stop against an end point of the movable barrier 26 travel. Thus, indexing may be performed by a controller 18 in connection with the back EMF sensor module 22 and the position sensor 28 may not be needed for that purpose.

As used herein, to index the operative parameters against the end points of the movable barrier 26 travel means to provide a static terminal end of the possible position of the movable barrier 26 such that relative position and/or direction data provided in connection with the operative parameters may be mapped to a physical location of the movable barrier 26 relative to a fixed spatial location. Thus, the relative position and/or direction data provided in connection with the actual operating parameters may be made to be spatially oriented so that the actual position and or direction relative to the end of travel of the movable barrier 26 and relative to an "opening" and/or "closing" direction is calculable by the controller 18 based on the operative parameters. When a position of the movable barrier 26 is related to a fixed spatial location such as an endpoint of the movement of the movable barrier 26, the position or direction data related to the fixed spatial location makes up a portion of the so-called "barrier position metrics" including an actual position and/or direction of a movement of the movable barrier 26.

The controller 18 may relate the barrier position metrics to a table of transition states. For instance, an end point of the movement of the movable barrier 26 is a transition state. At this transition state, the controller 18 directs the movable barrier 26 to transition from movement to non-movement. Other transition states may include a position along a travel of a movable barrier 26 at which the movable barrier 26 speeds up or slows down, or an associated torque changes such as due to the movable barrier 26 traveling through a path. Moreover, transition states may be proximate to other transition states, for instance, a transition state corresponding to a slowing of the movable barrier 26 may immediately precede a transition state corresponding to a transition from movement to non-movement. In this manner, a movable barrier 26 may more gradually start or stop movements. As such, a movable barrier 26 may be said to be "soft start" or "soft stop."

Attention is now directed to aspects of the drive assembly 10. As mentioned, the drive assembly 10 includes a multiphase drive circuit 20 and the multiphase brushless DC motor 24. The multiphase drive circuit 20 comprises a circuit configured to receive barrier movement instructions from the controller 18 and generate winding drive currents having waveforms tailored to generate particular behavior of the multiphase brushless DC motor 24 corresponding particularly to a specific barrier movement instruction received from the controller 18. The multiphase drive circuit 20 may adapt the winding drive currents over time to bring the actual operating parameters in closer correlation with the barrier movement instructions. Such machine learning and/or feedback may be accomplished by the controller 18 in connection with calculating a transfer function relating the barrier movement instructions to the actual operating parameters.

The multiphase drive circuit 20 may generate a separate winding drive current for each winding of the multiphase brushless DC motor 24. FIG. 2A depicts a multiphase drive circuit 20 delivering a first winding drive current via a first winding 23-1 to multiphase brushless DC motor 24, a second winding drive current via a second winding 23-2 to multiphase brushless DC motor 24, and a third winding drive current via a third winding 23-3 to multiphase brushless DC motor 24.

While the brushless DC motor 24 depicted in FIG. 2A has three sets of windings, it is also contemplated that a different number of windings may also be acceptable. Moreover, the brushless motor comprises a direct-current (DC) type. The brushless DC motor may be driven such that separate driving waveforms associated with each separate winding collaborate to cause the motor to rotate with a torque, direction, velocity, acceleration, and/or other characteristic as desired and under control of the controller 18 in response to the barrier movement instructions.

Attention is now directed to the movable barrier assembly 8. Referring to FIG. 2A, the movable barrier assembly 8 includes a movable barrier 26 that is movable in response to the control instructions from drive assembly 10. The movable barrier 26 may be a garage door, gate, or any of the different types of powered movable barriers.

The movable barrier 26 may be configured to be moved between its limit positions by the brushless DC motor 24 via an interconnection between the rotating output shaft of the motor 24 and the movable barrier 26. In certain applications, this interconnection is an intercoupled gearing arrangement. In other applications, the interconnection is a chain drive, in which a sprocket attached to the multiphase brushless DC motor 24 connects to a chain, which upon rotation of the motor shaft, moves the movable barrier 26.

Figure 2B:
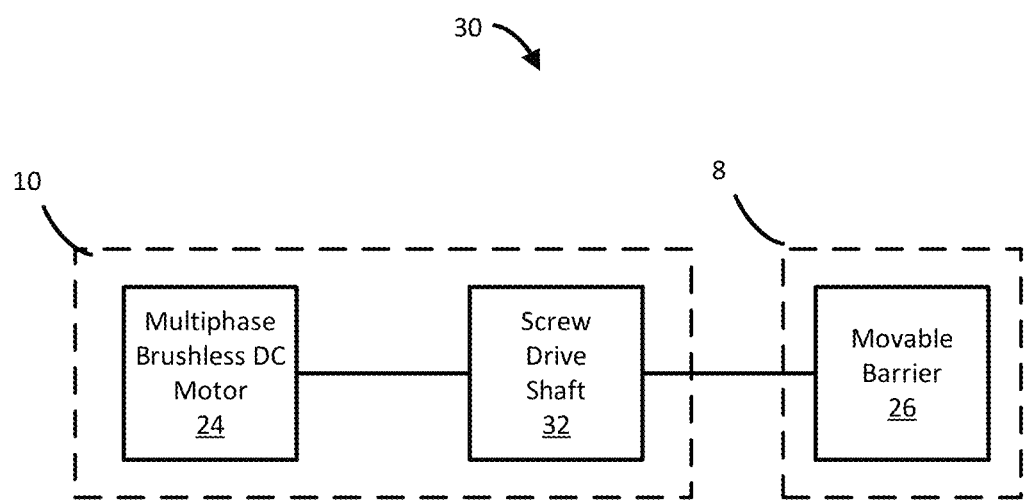
FIG. 2B is a detailed view of a subset of features of the movable barrier opener system of FIG. 2A, in which the drive assembly incorporates the multiphase brushless DC motor and a screw drive assembly.

However, in accordance with the preferred embodiment disclosed in FIG. 2B, a screw drive configuration 30 is employed. Specifically, the drive assembly 10 also includes a screw drive shaft 32 driven by the brushless DC motor 24. The screw drive shaft is directly connected to the movable barrier 26 of the movable barrier assembly. For example, the screw drive shaft 32 may comprise a threaded rod connectable to the rotating shaft of the multiphase brushless DC motor 24. As the motor shaft rotates, the screw drive shaft 32 rotates. As the screw drive shaft 32 rotates, a carriage, attached to the barrier 26, and having a threaded aperture that receives the rotating screw drive shaft 32, the carriage thus traveling up and down the threads of the screw drive shaft 32, with corresponding movement of the movable barrier 26.

Figure 3:
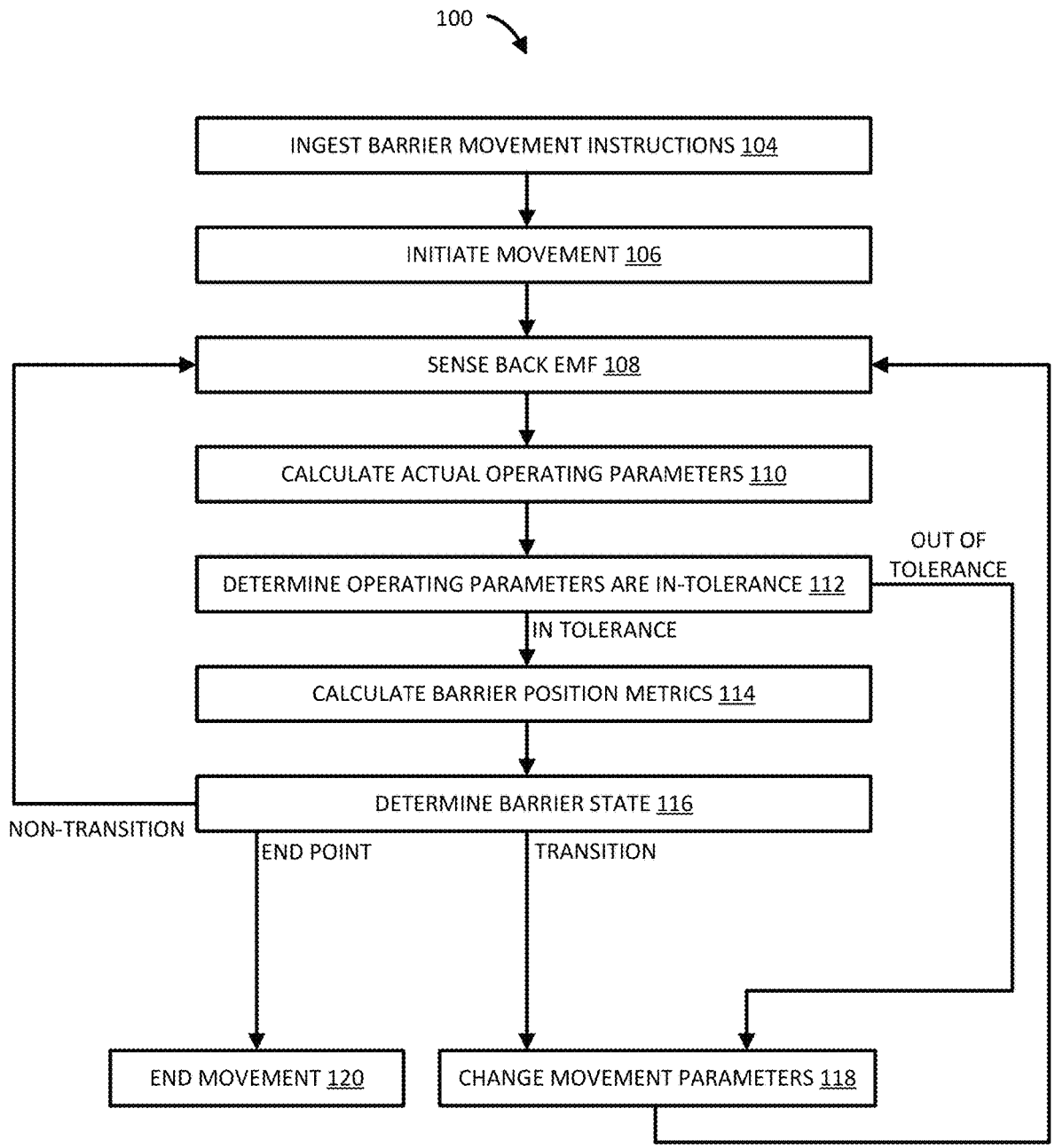
FIG. 3 is a flowchart of a movable barrier movement control method implementable with the movable barrier opener system illustrated in FIG. 2A.

With reference to FIG. 3, there is now described a method 100 of movable barrier movement control implementable with the movable barrier opener system 2, including the multiphase brushless DC motor 24, as previously described with reference to FIG. 2A. Accordingly, the controller 18 initially receives the externally transmitted command signals from the proximate or remote user-actuated sources previously described, and thereafter parses the data represented by such command signals to generate the barrier movement instructions that will be sent to the drive assembly 10. Thus, the first step of the process 100 is the ingestion by the controller 18 of the barrier movement instructions as to the desired motor direction, velocity, acceleration, and/or torque corresponding to the desired movement of a movable barrier 26 (block 104).

The controller 18, after the aforementioned parsing, may initiate movement. Specifically, the controller 18 next provides the barrier movement instructions to the multiphase drive circuit 20, that then drives the multiphase brushless DC motor 24, which thereby causes the movable barrier 26 to initiate movement (block 106). The controller 18 then senses the back EMF via the back EMF sensor module 22 generating and transmitting the back EMF sensor signal 13 to the controller 18 (block 108).

The controller 18, having received the back EMF sensor signal 13 data, and then interpreting the data, calculate the actual operating parameters, operative parameters as these parameters relate to at least one of the actual motor torque, direction, and/or other characteristic of the multiphase brushless DC motor 24 (block 110).

Upon calculation of the actual operating parameters, the controller 18 determines if the operating parameters are in-tolerance or out-of-tolerance. This means the controller 18 compares the value of at least one (or more) operating parameter to an expected range of values. This expected range of values may be derived from the movable barrier profile, from the interpretation matrix, or further may be derived from a table of safe operating parameters separately maintained by the controller 18 (block 112).

Upon the operative parameters being determined to be out of tolerance, the method 100 proceeds to block 118, discussed below. Upon the actual operating parameters being determined to in-tolerance, the controller 18 relates the operative parameters to the interpretation matrix to calculate barrier position metrics (block 114). Calculating barrier position metrics may include, for example, calculating a position of the movable barrier 26 relative to an end point of travel. Calculating barrier position metrics may also include comparing a back EMF of a winding of the multiphase brushless DC motor 24 sampled over time to an elapsed period of time. Because a back EMF may be associated with a motor torque, speed, acceleration, and or the like, this comparison permits calculation of a position of the movable barrier. Calculating barrier position metrics may further include comparing a multiphase brushless DC motor 24 torque to a position of the movable barrier 26 along the path of travel of the movable barrier 26 and mapping the experienced torque at the position along the path of travel to an expected torque at that position. In this manner, further barrier position metrics such as presence of a fault condition (for instance, presence of an obstruction) may be determined.

Having calculated the barrier position metrics, the controller 18 determines the barrier state (block 116). For instance, the controller 18 determines whether the barrier position metrics indicate that the barrier is at a transition state, such as a travel end point, or a point of acceleration, deceleration, torque change, impinging on an obstruction, undergoing a multiphase brushless DC motor over torque condition, undergoing a multiphase brushless DC motor overheat condition corresponding to a determined over torque and/or the like. Upon determination that the barrier is not at a transition state, the controller 18 determines that no change to the operating parameters is desired and the movement parameters provided to the multiphase drive circuit 20 continue unaltered. The method 100 returns to block 108 and back EMF continues to be sensed.

In response to the controller 18 determining that a change to the operative parameters is desired, for instance, so that the movable barrier 26 speeds up, slows down, stops, etc., the barrier movement instructions provided to the multiphase drive circuit 20 are changed by the controller 18 (block 118). Finally, and specifically in response to the controller 18 determining that the change of actual operating parameter that is desired is the stoppage of the movable barrier 26, the controller 18 provides barrier movement instructions to cease movement of the movable barrier 26 (block 120).

Thus, one may appreciate that various aspects of the movable barrier opener system 2 interoperate to effectuate a method 100 such as discussed above. However, while certain aspects of the method are discussed in sequence, in various embodiments, aspects of the method may occur in parallel. In addition, aspects of the method may occur in different sequences.

While the present disclosure has been described in the context of specific applications or embodiments, those skilled in the art, having benefit of this disclosure, will appreciate that other embodiments can be envisioned that also embody the new and improved process and apparatus of the present invention, as defined solely by the appended claims.

The invention claimed is:

1. A movable barrier opener system comprising:
   a drive assembly to move a movable barrier in response to barrier movement instructions, the drive assembly comprising:
   a multiphase brushless DC motor connectable to the movable barrier to move the movable barrier;
   a barrier operator connected to the drive assembly and comprising:
   a back EMF sensor module to detect a back EMF of a plurality of windings of the multiphase brushless DC motor and generate a back EMF sensor signal corresponding to the detected back EMF; and
   a controller configured to receive the back EMF sensor signal and determine an actual operating parameter of the multiphase brushless DC motor in response to the back EMF sensor signal, the controller also configured to determine that the actual operating parameter is within a tolerance comprising an expected range of values, and provide the barrier movement instructions to the drive assembly in response to the determination that the actual operating parameter is within the tolerance.

2. The movable barrier opener system of claim 1, the barrier operator further comprising:
a position sensor module connected to the controller and providing position sensor data to the controller corresponding to an indication that the movable barrier is at an end point of travel.

3. The movable barrier system of claim 1, wherein the drive assembly further comprises a multiphase drive circuit connected to the controller to receive the barrier movement instructions from the controller and connected to the plurality of windings of the multiphase brushless DC motor, wherein the multiphase drive circuit is configured to generate a plurality of drive signals corresponding to an excitation of the plurality of windings of the multiphase brushless DC motor.

4. The movable barrier opener system of claim 2,
wherein the actual operating parameters comprising at least one of a motor load, a movable barrier direction, and a movable barrier position,
wherein the controller relates the barrier movement instructions and the actual operating parameter by a transfer function to create a movable barrier profile comprising the tolerance for the actual operating parameter.

5. The movable barrier opener system of claim 1, wherein the drive assembly comprises a screw drive shaft connected to the multiphase brushless DC motor and rotatable thereby, wherein the movable barrier moves in response to the rotation of the screw drive shaft.

6. A method of movement control implementable with a movable barrier opener system including a multiphase brushless DC motor, the method comprising:
ingesting, by a controller, barrier movement instructions comprising at least one of a direction, velocity, acceleration, and torque corresponding to an intended movement of a movable barrier;
initiating, by the controller, movement of the movable barrier connected to the multiphase brushless DC motor, the initiating comprising providing the barrier movement instructions to a multiphase drive circuit to drive the multiphase brushless DC motor;
sensing, by a back EMF sensor module connected to the controller, a back EMF associated with a winding of the multiphase brushless DC motor and transmitting a back EMF sensor signal corresponding to the sensed back EMF to the controller;
calculating an actual operating parameter of the multiphase brushless DC motor in response to the back EMF sensor signal;
determining that the actual operating parameter is within or without a tolerance comprising an expected range of values; and
generating barrier movement instructions in response to the actual operating parameter being within or without the tolerance.

7. The method of movement control according to claim 6, the method further comprising changing the barrier movement instructions in response to the actual operating parameter being within the tolerance.

8. The method of movement control according to claim 6, wherein the actual operating parameter comprises at least one of a torque and a direction of the multiphase brushless DC motor that is moving the movable barrier.

9. The method of movement control according to claim 8, the method further comprising:
calculating a movable barrier position relative to an end point of travel in response to the said operating parameter; and
determining a barrier state corresponding to the movable barrier position.

10. The method of movement control according to claim 9, further comprising changing the barrier movement instructions in response to the determined barrier state being a transition state.

11. The method of movement control according to claim 10, wherein the transition state comprises at least one of an indication that the movable barrier is at a travel end point and impinging on an obstruction.

12. The method of movement control according to claim 10, wherein the transition state comprises at least one of an indication that the multiphase brushless DC motor is overheating corresponding to an overtorque condition of the multiphase brushless DC motor.

13. A non-transient computer readable medium containing program instructions for causing a movable barrier opener system including a multiphase brushless DC motor to perform a method of movement control, the method comprising:
ingesting, by a controller, barrier movement instructions comprising at least one of a direction and torque instruction corresponding to an intended movement of a movable barrier;
initiating, by the controller, movement of the movable barrier connected to the multiphase brushless DC motor, the initiating comprising providing the barrier movement instructions to a multiphase drive circuit to drive the multiphase brushless DC motor; and
sensing, by a back EMF sensor module connected to the controller, a back EMF associated with a winding of the multiphase brushless DC motor and transmitting a back EMF sensor signal corresponding to the sensed back EMF to the controller;
calculating an actual operating parameter of the multiphase brushless DC motor in response to the back EMF sensor signal;
determining that the actual operating parameter is within or without a tolerance comprising an expected range of values; and
generating barrier movement instructions in response to the actual operating parameter being within or without the tolerance.

14. The non-transient computer readable medium according to claim 13, the method further comprising changing the barrier movement instructions in response to the actual operating parameter being within the tolerance.

15. The non-transient computer readable medium according to claim 13, wherein the operating parameter comprises at least one of a torque and a direction of the multiphase brushless DC motor that is moving the movable barrier.

16. The non-transient computer readable medium according to claim 15, further comprising:
calculating a movable barrier position relative to an end point of travel in response to the operative parameter; and
determining a barrier state corresponding to the movable barrier position.

17. The non-transient computer readable medium according to claim 16, further comprising changing the barrier movement instructions in response to the determined barrier state being a transition state.

18. The non-transient computer readable medium according to claim 17, wherein the transition state comprises at least one of an indication that the movable barrier is at a travel end point, that the movable barrier is impinging on an obstruction, and that the multiphase brushless DC motor is overheating corresponding to an over torque condition of the multiphase brushless DC motor.

\* \* \* \* \*